United States Patent [19]
Sloop

[11] 3,851,161
[45] Nov. 26, 1974

[54] CONTINUITY NETWORK TESTING AND FAULT ISOLATING

[75] Inventor: Andrew P. Sloop, Pasadena, Calif.

[73] Assignee: Burroughs Corporation, Detroit, Mich.

[22] Filed: May 7, 1973

[21] Appl. No.: 358,040

[52] U.S. Cl. ............................ 235/151.3, 324/73 R
[51] Int. Cl. ............................................. G01r 31/02
[58] Field of Search ................... 235/151.31, 151.3; 324/73 PC, 73 R, 51, 52, 66, 73 R

[56] References Cited
UNITED STATES PATENTS

| | | | |
|---|---|---|---|
| 3,370,232 | 2/1968 | Wickersham | 324/73 R |
| 3,441,849 | 4/1969 | Bennett et al. | 324/73 R |
| 3,471,778 | 10/1969 | Bennett et al. | 324/73 R X |
| 3,492,571 | 1/1970 | Desler | 324/73 R |
| 3,535,633 | 10/1970 | Fallon | 324/73 R |
| 3,763,430 | 10/1973 | Terrey | 324/73 R |

Primary Examiner—Malcolm A. Morrison
Assistant Examiner—Edward J. Wise
Attorney, Agent, or Firm—Christie, Parker & Hale

[57] ABSTRACT

A technique is provided for testing a circuit network having a plurality of circuit nodes which can be considered to lie in an ordered array of addresses. Such a technique is suitable for testing printed circuit boards and the like for continuity of desired circuits and absence of short circuiting. A circuit network is fitted into a test jig so that electrical contact is made to all circuit nodes. A test signal is applied to one of the circuit nodes and its presence or absence is simultaneously detected on all circuit nodes. The highest order addresss where the test signal appears is compared with the address of the node on which the signal is applied. If the detected addresss is higher a true signal is generated, and if it is not higher a false signal is generated. This procedure is repeated by applying the test signal to each circuit node in the network. The true and false signals generated are compared with recorded signals from a similar network known to be acceptable and any discrepancy indicates a defective network. Absence of a discrepancy indicates an acceptable network. Comparison of signals indicates the nature and general location of a defect in the network.

40 Claims, 8 Drawing Figures

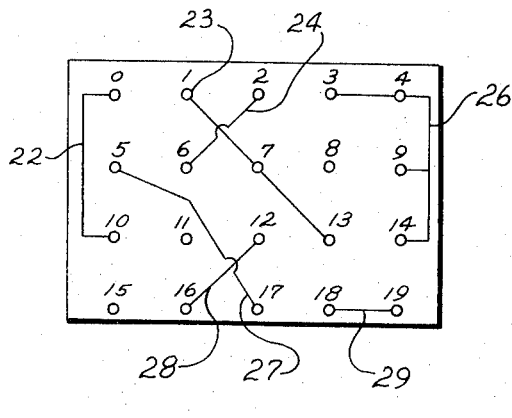
Fig_4
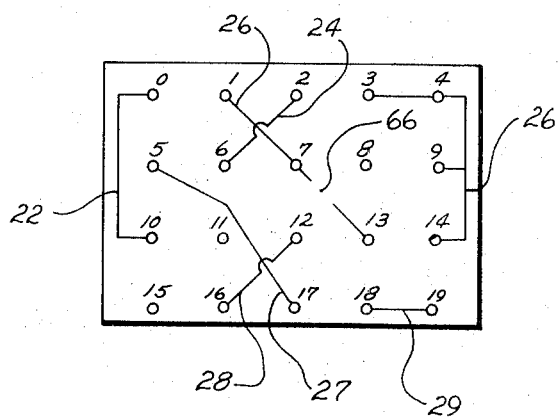
Fig_5
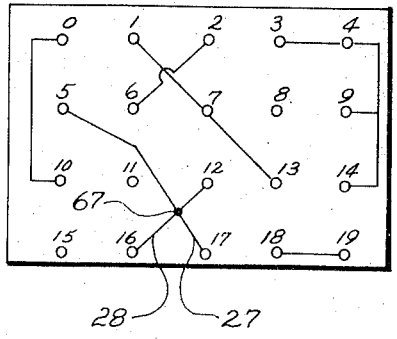
Fig_6
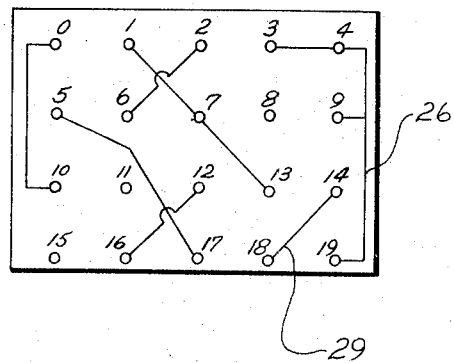
Fig_7

3,851,161

CONTINUITY NETWORK TESTING AND FAULT ISOLATING

BACKGROUND

Many pieces of modern electronic equipment rely heavily on very large scale printed circuit boards or panels having pins interconnected tin complex patterns by conductors of various types. Such boards are commonly used in computers and many other types of electronic equipment having complex circuitry. Such boards are fabricated with conductive paths, either in the form of circuits printed on the board or wiring between pins, prior to the installation of active circuit components on the board. After the printed circuit board is prepared, or the pin-type board is wired, it is desirable to check the circuits on the board to verify that all desired circuits have been made, that is, there are no open circuits, and also to verify that no unintentional circuits have been made, that is, short circuits. On a circuit board there are usually many circuits that prior to installation of active circuit components are not connected to the input and output leads of the board. There are, however, many points on the board to which electrical contact can be made, and these points can be considered as circuit nodes. Thus, for example, in a wired board each of the pins to which components are to be attached or sockets in which they are to be inserted provides a possible circuit node. On a printed circuit board, the circuit nodes are points at which circuit elements such as transistors, memory devices, resistors, connectors and the like are subsequently connected.

After a board has been manufactured, it is desirable to check and make sure that each circuit node is correctly connected to each circuit node to which it is supposed to be connected, and it is also desirable to verify the absence of unintentional connections. Such faults in a wired board can occur if, for example, wires are not properly connected to a pin to provide good electrical contact, or if a wire is connected to the wrong pin, or if two wires are accidentally shorted together, or if a wire is borken. In a printed circuit board such faults can occur, for example, due to lack of plating within a plated-through hole, or due to the presence of a small conductive path between circuit paths due to a blemish in a photographic negative or a failure in an etching solution. It should be recognized that these are merely typical faults that may occur in a circuit board, and it is very difficult to identify such errors by manual inspection. Modern boards may involve hundreds or even thousands of circuit nodes, and manual testing is prohibitive.

Circuit testing apparatus have therefore been developed for checking the presence or absence of conductive paths between the several circuit nodes on a circuit board. The prior technique has been to check one circuit node against each of the other circuit nodes in turn and then individually check each other circuit node against all other circuit nodes on the board to trace down each possible circuit path. The circuit paths found in this manner are then compared with the desired circuit paths to verify the acceptability of the board. Such apparatus is suitable when there are a limited number of possible circuit nodes; however, in modern boards with hundreds or thousands of circuit nodes, the time required to scan the entire board becomes prohibitive. Some scanning patterns have involved factorial increases of number of steps with increasing number of pins, and the time is prohibitive in production processes where it is not uncommon to check hundreds of boards per day. Thus, for example, even when the scanning is conducted at a rate in the order of megacycles per second, a matter of minutes may be required to check out all the possible circuit paths on a large-scale board.

It is therefore desirable to provide a method and apparatus for verification of the circuits on a circuit board in a very short time interval.

In co-pending U.S. patent application, Ser. No. 217,859, by Charles H. Terrey, entitled "CIRCUIT TESTING METHOD AND APPARATUS" and assigned to Burroughs Corporation, assignee of this application, now U.S. Pat. No. 3,763,430 there is provided a technique for testing circuit networks wherein a circuit node has a test signal applied thereto. All of the circuit nodes in the network having a lower (or higher) order address than the one to which the signal is applied are electrically shorted together. The test is repeated by applying the test signal to each circuit node successively with each node's lower order nodes shorted. The presence or absence of continuity between the circuit node under test and the shorted circuit nodes is noted and this information is used to distinguish acceptable networks from unacceptable networks. By this technique circuit networks such as printed circuit boards can be tested for acceptability by a single application of the test signal to each circuit node. At best this technique provides only a general indication of the location of a circuit fault, if one exists. Typically, for convenience in operating such an apparatus, not even this capability is available. Many circuit networks can be salvaged even though an open circuit or short originally exists. Rework of the networks is greatly expedited if the operator knows what type of fault is present and its general location.

It is, therefore, desirable to provide a technique for verifying the acceptability of circuit networks with one test per circuit node and also provide an indication of the nature and location of any faults that may be detected. A capability of such a technique for self-programming is also desirable.

BRIEF SUMMARY OF THE INVENTION

Therefore in practice of this invention according to a presently preferred embodiment there is provided a technique for testing a circuit network having a plurality of circuit nodes with an ordered array of addresses A by applying a test signal to a circuit node having a selected address $A_1$ and comparing the address $A_2$ of the highest order circuit node on which the signal is detected with the address $A_1$ of the circuit node to which the signal is applied. A first comparison signal is generated if $A_2$ is greater than $A_1$ and a second comparison signal is generated if $A_2$ is not greater than $A_1$. The technique is repeated while scanning the test signal over all of the circuit nodes in the network and the comparison signals so generated are compared with signals from a similar network known to be acceptable. Discrepancies can be used to identify and locate open circuits and shorts.

DRAWINGS

These and other features and advantages of the present invention will be appreciated as the same becomes better understood by reference to the following detailed description of a presently preferred embodiment when considered in connection with the accompanying drawings wherein:

FIG. 4 illustrates a typical acceptable circuit board;

FIG. 5 illustrates a board like that of FIG. 4 with an unintentional open circuit;

FIG. 6 illustrates a board like that of FIG. 4 with an unintentional short circuit;

FIG. 7 illustrates a board like that of FIG. 4 having desired connections inadvertently interchanged.

DESCRIPTION

Figure 1:
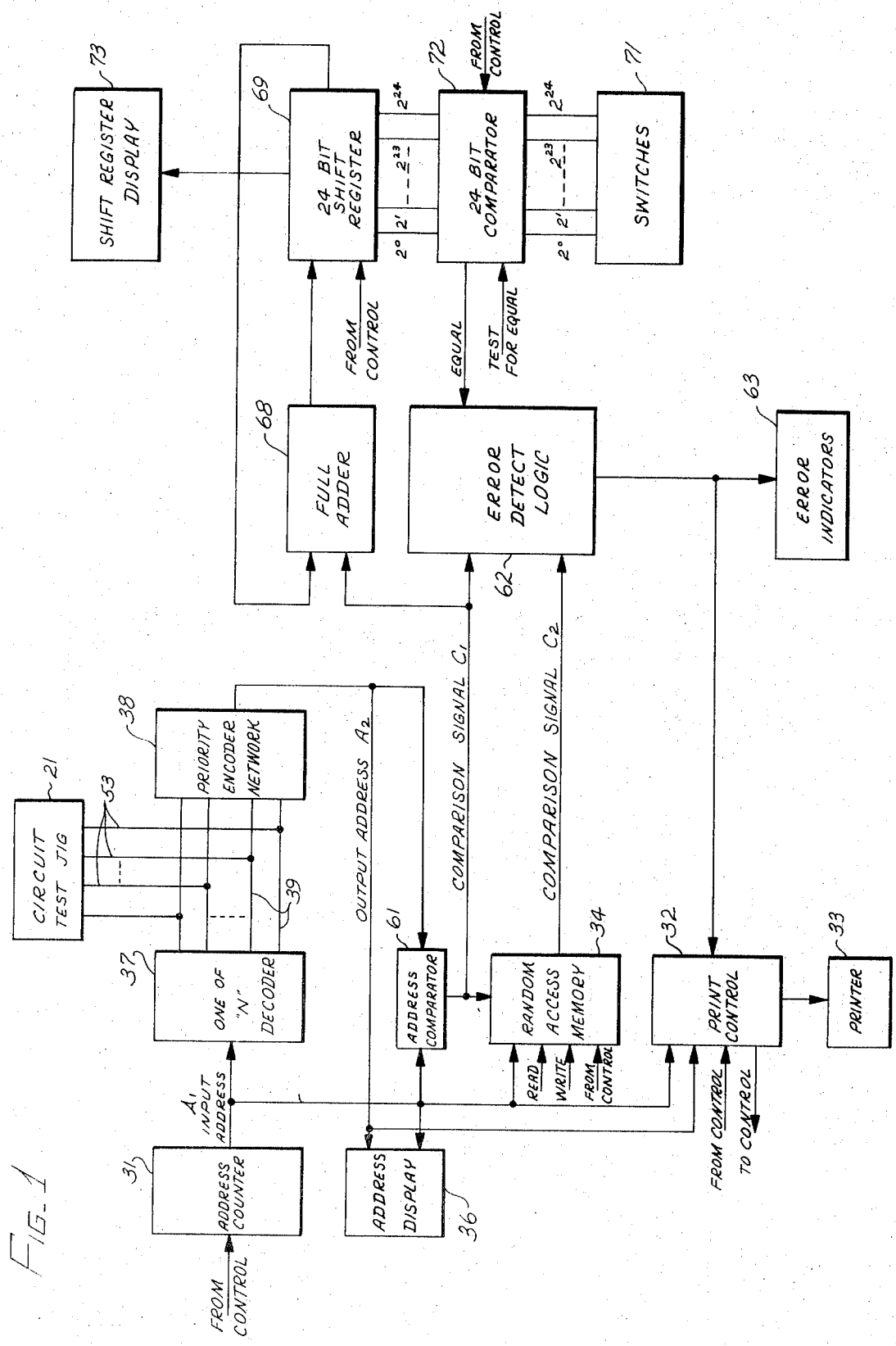
FIG. 1 illustrates in block diagram a circuit network testing apparatus constructed according to principles of this invention.

FIG. 1 illustrates in block diagram form a circuit testing apparatus constructed according to principles of this invention. In this presently preferred embodiment, a circuit test jig 21 is employed for making electrical connections to a circuit board such as that illustrated schematically in FIG. 4. The circuit test jig 21 is a conventional item presently employed with circuit testing apparatus and merely provides a fixture for holding the board and making electrical contact to selected points on the board, depending on the arrangement of contactors on the jig. It is, in effect, merely a connector between a circuit board or the like and the circuit testing apparatus. As described in the preferred embodiment, testing is conducted on a wired board having pins; however, it should be apparent that the same principles are equally applicable to a printed circuit board or other element having conductive circuits and any suitable test jig can be employed for interconnecting such a circuit element with the circuit testing apparatus.

FIG. 4 illustrates a typical wired circuit board having a rectangular matrix of pins numbered 0 to 19 in the illustrated embodiment. The numbers 0 to 19 can be considered the addresses A of the respective pins. It will, of course, be recognized that a board having only 20 pins in a 4 × 5 rectangular matrix is actually extremely simple as compared with the presently used boards having hundreds or thousands of pins; however, the principles are equally applicable to any number of pins, and 20 is sufficient for illustrating principles of this invention. The circuits illustrated on the board of FIG. 4 are also relatively simple, however, they also are sufficient to illustrate principles of this invention.

In a wired circuit board, electrically conductive wires are connected between pins for forming conductive paths prior to installation of active circuit components on the board. Thus, in the illustrated embodiment, a wire 22 interconnects pins 0 and 10. Another wire 23 interconnects pins 1, 7 and 13. A third wire 24 interconnects pins 2 and 6. Another wire 26 is connected to pins 3, 4, 9 and 14 so that these four pins are all electrically interconnected. An additional wire 27 interconnects pins 5 and 17. Another wire 28 interconnects pins 12 and 16, and a final wire 29 interconnects pins 18 and 19.

Each of the pins having addresses 0 to 19 comprises a circuit node to which electrical contact is made by the circuit test jig 21. In a circuit board it may occur that not all of the pins are interconnected, and often there will be pins such as, for example, pins 11 and 8 to which no wire is connected. As a matter of convenience in nomenclature, the first pin in each complete circuit when the addresses are scanned in a particular sequence is referred to as the lowest order node and the highest number pin is the highest order node. Thus, for example when scanned in numerical order, pin 3 is the lowest order node in the circuit including pins 3, 4, 9 and 14, and wire 26, and 14 is the address of the highest order node. Although described herein in terms of lower and higher order, it will be apparent that the ordering of the nodes in the network is arbitrary and the addressing in this manner is solely for convenience.

In practice of the method provided by this invention all of the nodes on the circuit board being tested are scanned in a sequence of increasing address with a forcing voltage. The forcing voltage is applied to one circuit node at a time in this arbitrary order. The order of scanning is not of importance so long as it is the same from one test to the next. The apparatus as illustrated in FIG. 1 includes an ordinary address counter 31 which provides as its output a binary input address $A_1$ unique to a circuit node contacted by the circuit test jig 21. The address counter 31 counts from lower to higher order address in response to a conventional control (not shown) clocked by a print control circuit 32 which controls a conventional printer 33 which, when used, is typically the slowest portion of the apparatus. The control simply maintains the various elements of the apparatus in synchronism. If desired, the apparatus can be manually stepped through a scan, but this is unrealistically slow.

The binary input address $A_1$ identifying the circuit node to which a test signal is to be applied also addresses a random access memory 34 which has a capacity at least as large as the number of nodes in the circuit tested. A number of 1 by 256 memory units were assembled to form a random access memory of sufficient size. The binary address $A_1$ is also applied to the print control 32 for recording each circuit node being tested if a permanent record is desired. If desired the printer may be shut off so long as acceptable boards are being tested and activated only when a faulty board is found so that the fault can be isolated. The binary address $A_1$ is also applied to an address display 36 for the convenience of the apparatus operator.

The binary input address $A_1$ is also applied to a selector circuit comprising a 1 of N decoder 37 and a priority encoder network 38. The output of the decoder is also connected to the circuit test jig 21 in parallel with the priority encoder. A portion of the combined decoder 37 and encoder 38 is illustated in greater detail in FIGS. 2 and 3.

Functionally, the decoder 37 applies a test signal to one of a plurality of lines 39, each of which is connected to one node of the circuit test jig 21. Each of the lines 39 is also connected to the priority encoder network 38. The test signal is applied to the circuit board by way of the circuit test jig 21 and appears on all circuit nodes of the circuit network that are electrically connected to the node to which the test signal is applied. Thus, the test signal appears at the priority encoder network not only on the line 39 addressed by the clarity. Eight leads 53 would extend from each selector 43 to the circuit test jig.) A true signal (e.g., +voltage) appears on one of the output leads Z and corresponding lead 53 in accordance with the binary input address if the 1 of 8 decoder is enabled. Thus the 1 of 8 decoder applies a test signal to a selected circuit node. For example, if input leads A0 and A1 are true and input lead A2 is false (and EO is true), a true signal appears on output lead Z3 and this signal is applied to the circuit node corresponding according to this address. This test signal is also an input to the corresponding operational amplifier 47 and hence appears on input lead I3 to the 8 input priority encoder 52.

Some of the leads 53 may be electrically interconnected by a circuit network under test if the circuit nodes to which they are connected are interconnected in that circuit network. Thus, the test signal may appear on other leads 53. These leads are connected to the inputs of the respective operational amplifiers 47 and therefore the test signal appears on each input lead I0 through I7 that is electrically connected to output lead Z3 by the circuit under test.

The 8 input priority encoder is a conventional integrated circuit with eight input data leads I0 through I7. The priority encoder has three binary output address leads Y0, Y1 and Y2 on which a three bit binary number is produced corresponding to the highest of the input leads I0 through I7 having a true signal thereon. In addition, the priority encoder has an output signal AI which is true whenever any of the input leads I0 through I7 is true. The priority encoder 52 has an input enabling lead $\overline{EO}$ which enables the priority encoder with a logical false signal and disables or inhibits output address output on the Y0, Y1 and Y2 leads when a true signal is present on the $\overline{EO}$ line. The truth table for the 8 input priority encoder is as follows:

| INPUTS | | | | | | | | | OUTPUTS | | | |
|---|---|---|---|---|---|---|---|---|---|---|---|---|
| I7 | I6 | I5 | I4 | I3 | I2 | I1 | I0 | $\overline{EO}$ | AI | Z2 | Z1 | Z0 |
| X | X | X | X | X | X | X | X | 1 | X* | 0 | 0 | 0 |
| 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 1 | 0 | 0 | 0 |
| 0 | 0 | 0 | 0 | 0 | 0 | 1 | X | 0 | 1 | 0 | 0 | 1 |
| 0 | 0 | 0 | 0 | 0 | 1 | X | X | 0 | 1 | 0 | 1 | 0 |
| 0 | 0 | 0 | 0 | 1 | X | X | X | 0 | 1 | 0 | 1 | 1 |
| 0 | 0 | 0 | 1 | X | X | X | X | 0 | 1 | 1 | 0 | 0 |
| 0 | 0 | 1 | X | X | X | X | X | 0 | 1 | 1 | 0 | 1 |
| 0 | 1 | X | X | X | X | X | X | 0 | 1 | 1 | 1 | 0 |
| 1 | X | X | X | X | X | X | X | 0 | 1 | 1 | 1 | 1 |

* If any input of {I0, . . . , I7} is true, AI will be true.

Referring again to FIG. 2 the output signal AI from selector 43h which represents the highest order selector in this group of eight is connected to the $\overline{EO}$ input to the selector 43g which is the next lowest selector in 1 of 64 arrangement illustrated in FIG. 2.

Figure 2:
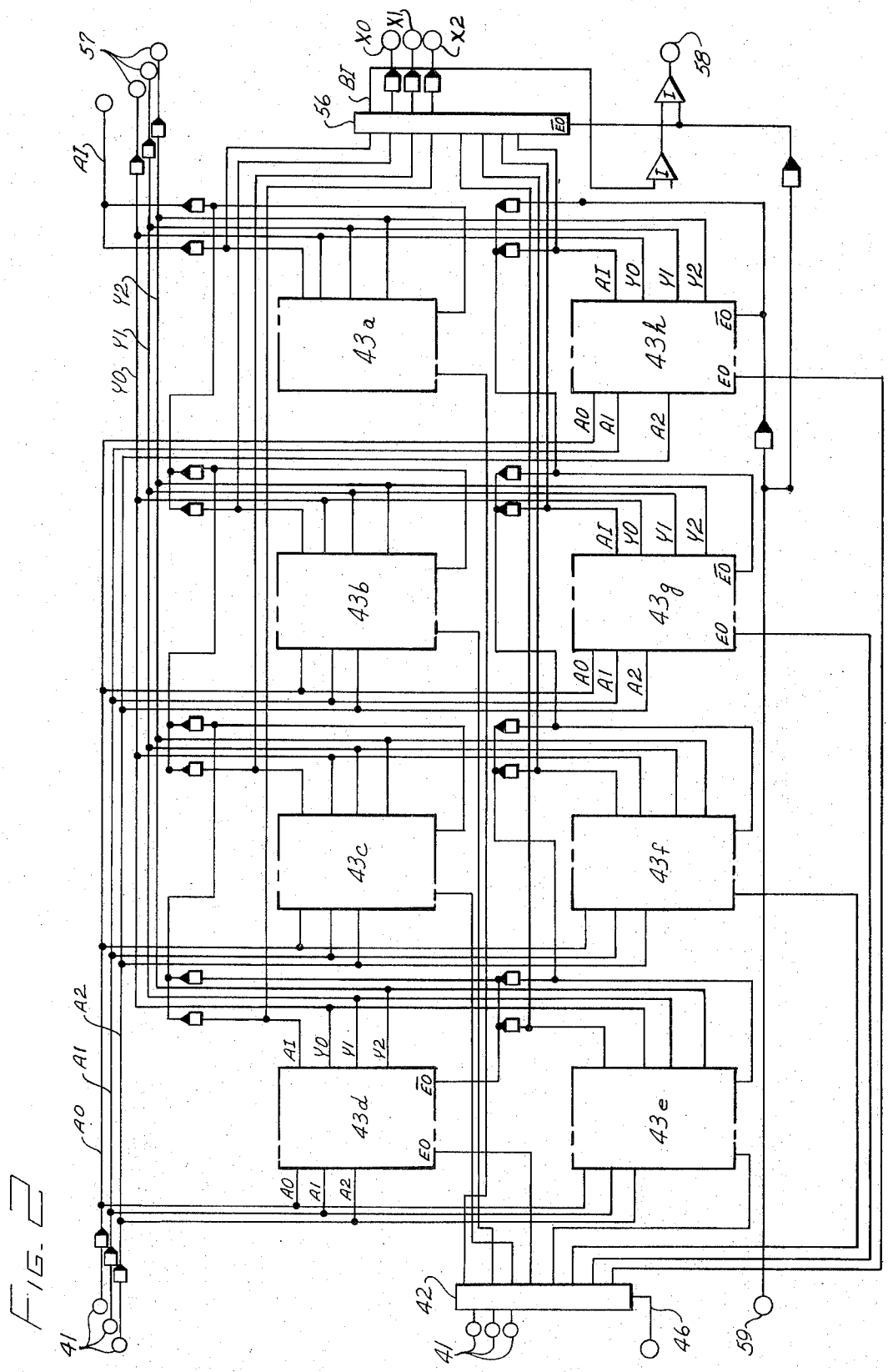
FIG. 2 illustrates semi-schematically a 1 of 64 selector for the testing apparatus.

A conventional buffer or restorer 54 is connected in the line between the output AI of selector 43h and the input $\overline{EO}$ of selector 43g. The buffer 54 serves the purpose of assuring an adequate signal strength by compensating for losses that may occur in the logic elements of the system. In addition, the buffer effectively serves as a diode for inhibiting cross talk and feedback of the signals. A suitable buffer is a Fairchild Semiconductor hex restorer number 9816. Several such buffers, each indicated by the same symbol as the buffer 54 in FIG. 2, are included in the system at selected points for the same purpose.

It will be recalled that the output AI is true if the test signal appears on any circuit node to which the selector 43h is connected. A true signal on the $\overline{EO}$ input of the selector 43g inhibits or disables it so that there is no true output data signal even if the test signal appears on one or more of the circuit nodes connected to the selector 43g. Thus, similarly the AI output signal from both selectors 43g and 43h are connected to the input enable lead $\overline{EO}$ of the next lower order selector 43f. A true signal from either 43g or 43h inhibits selector 43f. Each output signal AI from a higher order selector is connected to the input enable lead $\overline{EO}$ of all lower order selectors. Thus, the presence of a true signal on any selector output lead AI inhibits appearance of a true signal on the output address leads Y of all lower order selectors.

The output signals AI from the eight selectors 43a through 43h are connected as the eight input leads to an 8 input priority encoder 56. The 8 input priority encoder 56 is the same as the priority encoder 52 hereinabove described and illustrated in FIG. 3. The priority encoder 56 has three address data outputs X0, X1 and X2, the binary signals on which identify the highest order input lead on which a true signal appears. Thus, the three bit binary number on the address leads X0, X1 and X2 identifies the selector having the highest address at which the test signal appeared.

The three binary output address data leads Y0, Y1 and Y2 from the eight selectors 43a through 43h are bused together to a single set of output terminals 57. It will be recalled that output address signals are inhibited from all selectors except the highest order one on which the test signal appears. Thus, the three bit binary address appearing on the terminals 57 partially identifies the highest order node on which the test signal appears.

Figure 3:
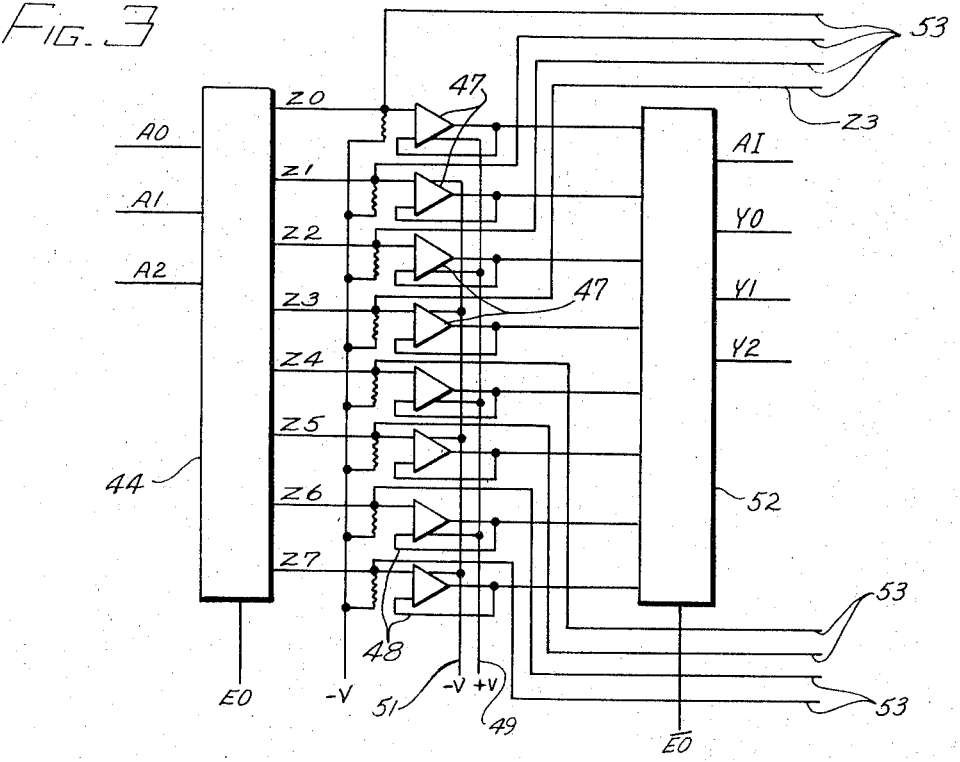
FIG. 3 illustrates a 1 of 8 selector detail for the selector of FIG. 2.

The priority encoder 56 has an output BI which is true if any of the inputs are true, that is, it is true if the test signal appears on any of the circuit nodes represented by the circuitry of FIGS. 2 and 3. This signal is twice inverted in an exclusive NOR arrangement to an output terminal 58. The other input to the exclusive NOR arrangement is from an input terminal 59 to the circuit card on which a "lower order address inhibit" signal may be presented from a higher order circuit card like that illustrated in FIG. 2. The lower order address inhibit signal to all lower order circuit cards is the output AI signal from all higher order circuit cards. This lower order address inhibit signal is applied to the diabling input $\overline{EO}$ of the selector 43h and also to the disabling input $\overline{EO}$ of the priority encoder 56. In this manner the entire address output of the circuit card illustrated in FIG. 2 is inhibited if a true signal is present decoder 37 but also on each line electrically connected therewith by way of the circuit board under test.

Functionally the priority encoder network 38 distinguishes the line 39 on which the test signal appears that has a higher address than any other line on which the test signal appears. It thus identifies the highest order node (including the one addressed) that is electrically connected to the test node.

The output of the priority encoder network 38 is a binary output address $A_2$ corresponding to the address of the highest circuit node on which the test signal appears. The output address $A_2$ will always be equal to or greater than the input address $A_1$. If the circuit node $A_1$ to which the test signal is applied is the highest order (or only) node in an electrical circuit on the board, the output address $A_2$ will equal the input address $A_1$. If the circuit node to which the test signal is applied is electrically connected to any higher order circuit node or nodes, the output address $A_2$ will be higher than the input address $A_1$ and correspond to the highest address to which it is connected.

Thus, for example, referring to FIG. 4 if the input address $A_1$ is to pin number 3 which is electrically connected to pins 4, 9, and 14, the output address $A_2$ will be 14. Similarly, the output address will be 14 when either of pins 4, 9 or 14 is the input address. If the input address $A_1$ is to pin number 6, the output address $A_2$ will also be 6 since this pin is connected only to lower order pin number 2. The output address will be 8 when the input address is 8, since pin number 8 is not electrically connected to any other.

FIG. 2 illustrates semi-schematically one typical portion of the selector of the circuit testing apparatus such as might be mounted on a single printed circuit card in constructing such an apparatus. This selector subsystem corresponds to a 1 of 64 decoder and corresponding 64 input priority encoder network which forms a fraction of the decoder 37 and encoder 38 of FIG. 1. As will become apparent a number of such 64 line sub-systems can be pyramided for obtaining any desired magnitude of input address and output address and hence any desired number of circuit nodes in the circuit under test. There are six input address terminals 41 to the circuit on which six bits of the binary input address $A_1$ appear during operation. Three bits of the address are applied to a conventional 1 to 8 decoder 42, the eight outputs of which are applied to eight 1 of 8 selectors 43a through 43h, respectively. The other three bits of address are applied to all of the selectors 43. One of the 1 of 8 selectors 43 is illustrated in greater detail in FIG. 3. Each of the selectors 43 comprises a portion of the 1 of N decoder and the priority encoder network.

As illustrated in FIG. 3 the selector has a 1 of 8 decoder 44 and an 8 input priority encoder 52. The 1 of 8 decoder is a conventional integrated circuit package having three binary input leads A0, A1 and A2. A suitable decoder is available from Fairchild Semiconductor under their catalog number 9838. The three bits of binary address information are applied to the three input leads. The decoder 44 has eight output leads Z0 through Z7 and a true signal is applied to one and only one of these output leads in accordance with the three bit binary number 0 to 7 on the three input leads. In addition, the decoder has an enabling input E0 so that an output signal is obtained from the decoder only when there is a "true" enable signal. (The conventional decoder also has a "disable" lead which is typically not needed nor employed in practice of this invention.)

The truth table for the 1 of 8 decoder 44 is as follows:

| INPUTS | | | | OUTPUTS | | | | | | | |
| --- | --- | --- | --- | --- | --- | --- | --- | --- | --- | --- | --- |
| E0 | A2 | A1 | A0 | Z0 | Z1 | Z2 | Z3 | Z4 | Z5 | Z6 | Z7 |
| 1 | 0 | 0 | 0 | 1 | 0 | 0 | 0 | 0 | 0 | 0 | 0 |
| 1 | 0 | 0 | 1 | 0 | 1 | 0 | 0 | 0 | 0 | 0 | 0 |
| 1 | 0 | 1 | 0 | 0 | 0 | 1 | 0 | 0 | 0 | 0 | 0 |
| 1 | 0 | 1 | 1 | 0 | 0 | 0 | 1 | 0 | 0 | 0 | 0 |
| 1 | 1 | 0 | 0 | 0 | 0 | 0 | 0 | 1 | 0 | 0 | 0 |
| 1 | 1 | 0 | 1 | 0 | 0 | 0 | 0 | 0 | 1 | 0 | 0 |
| 1 | 1 | 1 | 0 | 0 | 0 | 0 | 0 | 0 | 0 | 1 | 0 |
| 1 | 1 | 1 | 1 | 0 | 0 | 0 | 0 | 0 | 0 | 0 | 1 |

Referring again to FIG. 2 the 1 of 8 decoder 42 is the same as the 1 of 8 decoder 44, having a true output signal on one of its eight output leads in response to a three bit binary input signal on the leads 41. The enable lead 46 to the decoder 42 is connected to another decoder (not shown) on another printed circuit card which may in turn be connected to additional decoders so that only one printed circuit card is enabled at any one time. The eight output leads of the 1 of 8 decoder 42 are applied as the respective enable signals EO on the selectors 43a through 43h, so that only one of the selectors may be enabled in response to a binary signal on 1 of 8 decoder 42.

Referring again to FIG. 3 each of the output leads Z from the 1 of 8 decoder 44 is applied to a conventional operational amplifier 47 having a conventional voltage follower feedback loop 48. A suitable operational amplifier is available from National Semiconductor as their catalog number LM1558/LM1458 dual operational amplifier. Each such unit actually has two operational amplifiers in each integrated circuit package so that four such packages are used for the eight operational amplifiers 47. The plus voltage 49 and minus voltage 51 leads applied to the operational amplifiers 47 are simply due to the choice of operational amplifiers for this embodiment and other power arrangements will be apparent to one skilled in the art. The outputs of the eight operational amplifiers 47 connected to the 1 to 8 decoder 44 are connected to the eight input leads 10 through 17 of a conventional solid state 8 input priority encoder 52. A suitable encoder is available from Fairchild Semiconductor under their catalog number 9883.

The output leads Z0 through Z7 of the 1 of 8 decoder 44 are also connected to leads 53 which extend to the circuit test jig 21 (FIG. 1). Each of the leads 53 connects to an individual circuit node on the circuit network under test. (In FIG. 2 the leads 53 are omitted for on a higher order address than those represented by this portion of the circuit.

The inhibition of lower order output addresses ripples through the several circuit cards making up the apparatus in the same manner that the AI signal ripples through the several selectors 43 in FIG. 2. The resultant output address therefore represents the highest order circuit node on which the test signal appears.

In a typical embodiment of circuit board testing apparatus, 50 or more printed circuit cards, each of which is a 1 of 64 decoder-encoder network may be used. For example, eight groups of eight circuit cards may be used. Each of these circuit cards is a 1 of 64 decoder-encoder combination as illustrated in FIG. 2. The address of any individual line or node in such as array is defined by 12 binary bits. Three of these bits define the group of cards, three bits define the specific card, three bits identify the selector, and the remianing three bits define the individual line. A series of 1 of 8 decoders like the decoders 42 and 44 decode the binary input address to apply the test signal only to the addressed line and hence addressed circuit node.

The groups, cards, selectors, and lines define an ordered array and the test signal may appear on a substantial number of lines in this ordered array. Each circuit card has the same ability as the card illustrated in FIG. 2 to give an output signal AI when that card is active, that is, when the test signal appears on at least one of the lines on that card. The output AI signal from each higher order card is applied to the lower order cards as the inhibit EO signal for all lower order cards. Thus, an output address signal $A_2$ is obtained only from the card having the highest order node on which the test signal appears. This signal rippling from a higher order card to all lower cards has been called the "lower order address inhibit" signal hereinabove.

This lower order address inhibit signal is also applied to the exclusive NOR circuit leading to the output terminal 58 (FIG. 2). A true signal appears on the terminal 58 if the card illustrated in FIG. 2 is active and no higher order card is active. That is, a true signal appears on the output 58 if the highest order circuit node is on the illustrated card. A false signal appears on the terminal 58 if either a higher order card is active or the llustrated card is inactive. This serves to identify the card on which the highest order active circuit node is located. The terminal 58 is in turn connected to an 8 input priority encoder (not shown) like the priority encoders 52 and 56. This serves to provide a binary signal identifying the active card and an additional priority encoder (not shown) identifies the group in which the card lies.

It will be noted that the output address signal $A_2$ identifying the highest order circuit node is also a 12 bit binary number for the exemplary embodiment. Six bits of this number are on the output address lines X0, X1, X2, Y0, Y1, and Y2 respectively. The other six bits come from the additional priority encoders (not shown) identifying the card and group of cards on which the highest order signal appears. It will be apparent that with such 8 line decoders and encoders, any desired number of circuit nodes may be included in the circuit network under test.

Although the arrangement exemplified in FIGS. 2 and 3 is preferred for practice of this invention since it can be readily implemented by conventional solid state integrated circuit components, it will be apparent that other arrangements can be provided for applying a test signal to a selected one of a number of circuit nodes. Other logical arrangements for identifying a highest order node where a signal is present, such as for example a number of interconnected and interdependent relays can also be employed. Such alternate arrangements are not only cumbersome and expensive but are relatively slow in operation. The present solid state arrangement essentially operates in parallel and is preferable to a serial arrangement for identifying the highest order address.

The output address $A_2$ from the priority encoder network 38, a portion of which has been described and illustrated in FIGS. 2 and 3, is applied to the address display 36 (FIG. 1) so that the apparatus operator can ascertain the highest order address at which the test signal appears, if so desired. During the normal mode of screening boards for acceptability this information is obtained too rapidly to be of any immediate value to an operator. The clock rate can be decreased to permit visual observation or the apparatus can be programmed to stop when a specified condition is detected or address is reached.

The highest order output address $A_2$ and the input address $A_1$ are also applied to an address comparator 61. The address comparator simply determines whether $A_2$ is equal to or greater than $A_1$. If $A_2$ is greater than $A_1$, the output comparison signal $C_1$ from the comparator 61 is true. If the output address $A_2$ is equal to the input address $A_1$, the output comparison signal $C_1$ is false ($A_2$ is never less than $A_1$ since the test signal always appears on at least the input address line).

Typically the first step in operating the apparatus is to insert a circuit network which is known to be acceptable (that is, free of faults) in the circuit test jig 21. The apparatus is actuated and a series of highest order output addresses $A_2$ are generated in a one-to-one correlation with the binary input addresses $A_1$. Each highest order output address $A_2$ is compared with the corresponding input address $A_1$ and the comparison signal $C_1$ from the comparator 61 is applied to the random access memory 34 while it is in its writing mode. Thus, the data recorded in the random access memory is a single binary true or false (1 or 0) for each input address $A_1$ indicating whether the highest order output address $A_2$ is greater than or equal to the input address $A_1$, respectively.

Once the comparison signal for a circuit network known to be acceptable have been recorded in the random access memory, it is switched from a writing to a reading mode. A circuit network to be tested is then inserted in the circuit test jig and the input addresses are again scanned to apply the test signal to each circuit node in the network. A comparison signal $C_1$ is generated in the same manner hereinabove described.

As each comparison signal $C_1$ corresponding to an input address $A_1$ is generated, the random access memory is read for that input address and the recorded signal is read out as a second comparison signal $C_2$. The two comparison signals $C_1$ and $C_2$ are both applied to the error detection logic 62. When $C_1$ equals $C_2$ for all input addresses on the circuit network under test, the network is considered identical and passes the test. Since the comparison signals $C_1$ and $C_2$ can only be true or false, identity of the two signals for each address is readily determined. Conversely, if either comparison signal $C_1$ or $C_2$ is true for an input address when the other is false, a discrepancy exists between the circuit network under test and the previously tested circuit network known to be acceptable. Such a discrepancy indicates a fault in the circuit network under test.

If $C_1$ is true and $C_2$ is false, the true $C_1$ signal means that the highest order address $A_2$ on the circuit network under test is higher than the input address $A_1$ and therefore there is electrical continuity to a circuit node higher than the one addressed, and the false recorded comparison signal $C_2$ indicates that there should not be electrical continuity to a higher order node. Therefore, if the measured comparison signal $C_1$ is true and the recorded comparison signal $C_2$ is false, there is an undesired short circuit from the circuit node being addressed to some higher order circuit node. One thus determines that the fault is a short circuit and identifies a circuit node from which the short exists to a higher order node.

Conversely, if the comparison signal $C_1$ from the circuit network under test is false and the recorded comparison signal $C_2$ is true, it will be apparent that a circuit that should be present from the node under test is "open." Thus, one determines the presence of an open circuit and a node that should have been connected to a higher order node.

The output of the error detect logic 62 is a first signal indicating that the circuit network under test passes if $C_1$ equals $C_2$ for all input addresses. This output information is applied to error indicators 63 which can be simply panel lights which indicate when a circuit has passed or failed. If at any comparison signal $C_1$ from the circuit under test does not equal the corresponding comparison signal $C_2$ from the memory, a light is illuminated indicating that the circuit network has failed or been rejected. In addition, if the discrepancy is such that $C_1$ is true when $C_2$ is false, another light indicates that a "short" is present. Similarly, if $C_1$ is false when $C_2$ is true, still another light indicates that an "open" is present. This same indication of passing, short circuit or open circuit is also applied to the print control 32 so that a permanent record of acceptable circuit networks and location of faults can be made if desired. Typically, if a board fails to pass, the address counter 31 is recycled with the printer 33 operating so that the input address $A_1$ and highest order address $A_2$ are recorded along with the error indication, thereby providing a permanent record of the general location and nature of the fault on the circuit network under test.

Figure 8:
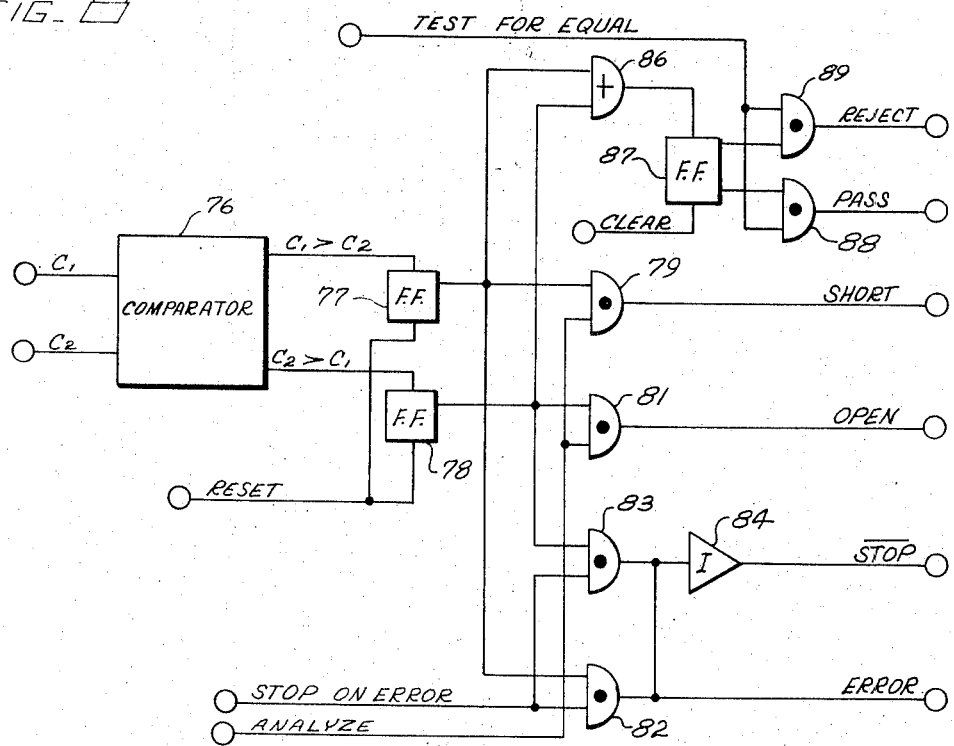
FIG. 8 illustrates schematically the error detection logic of the apparatus of FIG. 1.

FIG. 8 illustrates schematically the error detect logic which provides the output signals to he error indicators. The two comparison signals $C_1$ and $C_2$ from the address comparator 61 and random access memory 34, respectively, are applied to a comparator 76. If the two comparison signals are the same there is no output from the comparator. If the comparison signal $C_1$ from the circuit under test is greater than the comparison signal $C_2$ from the random access memory, the comparator output sets a flip-flop 77 (a logical 1 is considered greater than a logical 0). If, on the other hand, the comparison signal $C_2$ from the random access memory is true (1) when the comparison signal $C_1$ from the circuit network under test is false (0), the comparator output sets a second flip-flop 78. The two flip-flops 77 and 78 are reset each clock pulse of the apparatus. Thus if there is a discrepancy between the comparison signals at any address as the circuit nodes are scanned, one or the other of the flip-flops 77 or 78 is set. If there is no discrepancy, both flip-flops remain reset.

When the flip-flop 77 sets, an output signal is applied to an AND gate 79. Another input to the AND gate 79 is an "analyze" signal from a panel switch (not shown) which is ON when the operator wishes to analyze the circuit network under test for short or open circuits. If the flip-flop 77 sets when the analyze switch is ON, the AND gate 79 applies a "short" signal to activate a suitable indicator such as a lamp on the panel 63 (FIG. 1). This indication of a short is also applied to the print control 32 if a permanent record of the existence of a short circuit at a particular address is desired.

The set output of the flip-flop 78 is applied to an AND gate 81 along with the analyze signal. The output of the AND gate 81 provides an "open" signal for lighting a suitable indicator or recording the indication, if desired.

The set outputs of the flip-flops 77 and 78 are applied to a pair of AND gates 82 and 83 respectively. The other input to the AND gates 82 and 83 is a "stop on error" signal from a panel switch (not shown). The outputs of the two AND gates 82 and 83 are applied to an inverter 84 to provide a "$\overline{stop}$" signal if a discrepancy occurs between the comparison signals $C_1$ and $C_2$. The "$\overline{stop}$" signal is used to stop the scan of addresses at the input address where a discrepancy is noted.

The operator can then read the input address $A_1$ and the highest order output address $A_2$ on the address display 36 and note whether the discrepancy represents a short circuit or open circuit. This information tells him the approximate location of the fault in the circuit under test. If a short is indicated the two addresses identify the highest order nodes in the two circuits that are shorted together. It does not indicate at what point within those circuits the short may be present. This is the case since, for example, if the two lowest order nodes in two circuits are shorted together there will be an indication of a higher order address for each input address until the highest order circuit node in one of the circuits is reached. Up to that point, the logic has not noted a discrepancy since the comparator 76 only reacts to the presence or absence of a higher order address without regard to how much higher that address might be. When the descrepancy is noted, the machine stops and the node addressed and the highest order node on which the signal appears are displayed. This identifies the highest order nodes in the two circuits shorted together.

When an open circuit is indicated, the highest order node on which the signal appears is the node addressed. The circuit so identified can be traced and the open circuit usually readily located. If need be, comparison can be made to a board known to be acceptable to identify the highest order node in the desired circuit.

The set states of the two flip-flops 77 and 78 are also applied to an OR gate 86. The output of the OR gate sets a flip-flop 87. The flip-flop 87 is reset by a "clear" signal at the beginning of each complete scan of the addresses. The reset output of the flip-flop 87 is connected to an AND gate 88, the output of which provides a "pass" signal for illuminating an appropriate display. The other input to the AND gate 88 is a "test for equal" signal described in greater detail hereinafter. So long as the test for equal signal remains true and the flip-flop 87 remains in its reset condition, a circuit board is indicated to pass inspection.

The set output of the flip-flop 87 is applied to an AND gate 89, the output of which provides a reject signal when the test for equal signal is received. If any discrepancy occurs between the comparison signals $C_1$ and $C_2$, one or the other of the flip-flops 77 or 78 is set. Either of these occurrences sets the flip-flop 87 to provide a rejection signal at the end of a scan.

The outputs of the two AND gates 82 and 83 which provide the $\overline{stop}$ signal are also connected to a suitable "error" indicator (not shown) to show that the apparatus has stopped when the "stop on error" switch is ON, in response to an error rather than some other cause. This indication is employed in addition to the "reject" indication since the latter is ordinarily activated only at the end of a scan.

The circuit boards of FIGS. 4 to 7 illustrate application of principles of this invention to three types of faults that may occur in circuit networks. When the acceptable board illustrated in FIG. 4 is scanned, a series of comparison signals are obtained for each circuit node. For circuit node number 0 the comparison signal is true (1) since this circuit node is connected to higher order circuit node number 10 by a wire 22. Similarly true comparison signals are obtained for input addresses 1 through 5. The comparison signal is false (0) for address number 6 since this circuit node is connected only to lower order node number 2 by a wire 24 and it is not connected to any higher order node.

The following table sets forth in comparison signals generated for each address as the board in FIG. 4 is scanned and also presents similar data for the boards of FIGS. 5 to 7 hereinafter described in greater detail. In both the table and text, the symbol "1" is used synonymously with "true" and the symbol "0" is the same as "false." Typically, in an apparatus the true signals are represented by a positive voltage and false signals by an absence of such voltage.

The above table sets forth the comparison signals for the board of FIG. 5 which are the same as the corresponding signals for the board of FIG. 4 except for circuit node 7. Circuit node number 7 yields a false (0) comparison signal since circuit node number 7 is not connected to any higher order node. (Discrepancies from the board of FIG. 4 are underlined for clarity in the table.) As pointed out above the existence of a logical 0 where there should have been a logical 1 indicates an open circuit. Further, the data shows that this open circuit exists between circuit node number 7 and a higher order node to which it should be connected.

The above table lists not only the comparison signals for each of the circuit boards illustrated in FIGS. 4 to 7 but also lists the highest order address on which the test signal highest order address on which the test signal appears for each input address. During routine screening of boards for acceptability only the comparison signals are used. If a discrepancy is noted, the highest order addresses for each input address can be recorded for comparison with the highest order addresses from a board known to be acceptable.

The highest order addresses recorded for the board of FIG. 5 show a discrepancy at input addresses 1 and 7. By comparison with the highest order address for the board of FIG. 4, it is seen that both of these circuit nodes (1 and 7) should have been connected to circuit node 13. Thus, it is known that the open circuit is between circuit node 13, or a chain of nodes connected to 13, and the chain of nodes including numbers 1 and 7. On a more complex board than the one illustrated herein, the circuit connection may meander and the physical location of the open circuit may not be on a

| INPUT ADDRESS | FIG. 4 $C_1$ | Add.* | FIG. 5 $C_1$ | Add.* | FIG. 6 $C_1$ | Add.* | FIG. 7 $C_1$ | Add.* |
|---|---|---|---|---|---|---|---|---|
| 0  | 1 | 10 | 1 | 10 | 1 | 10 | 1 | 10 |
| 1  | 1 | 13 | 1 | _7_ | 1 | 13 | 1 | 13 |
| 2  | 1 | 6  | 1 | 6  | 1 | 6  | 1 | 6  |
| 3  | 1 | 14 | 1 | 14 | 1 | 14 | 1 | _19_ |
| 4  | 1 | 14 | 1 | 14 | 1 | 14 | 1 | _19_ |
| 5  | 1 | 17 | 1 | 17 | 1 | 17 | 1 | 17 |
| 6  | 0 | 6  | 0 | 6  | 0 | 6  | 0 | 6  |
| 7  | 1 | 13 | _0_ | _7_ | 1 | 13 | 1 | 13 |
| 8  | 0 | 8  | 0 | 8  | 0 | 8  | 0 | 8  |
| 9  | 1 | 14 | 1 | 14 | 1 | 14 | 1 | _19_ |
| 10 | 0 | 10 | 0 | 10 | 0 | 10 | 0 | 10 |
| 11 | 0 | 11 | 0 | 11 | 0 | 11 | 0 | 11 |
| 12 | 1 | 16 | 1 | 16 | 1 | _17_ | 1 | 16 |
| 13 | 0 | 13 | 0 | 13 | 0 | 13 | 0 | 13 |
| 14 | 0 | 14 | 0 | 14 | 0 | 14 | 1 | _18_ |
| 15 | 0 | 15 | 0 | 15 | 0 | 15 | 0 | 15 |
| 16 | 0 | 16 | 0 | 16 | 1 | _17_ | 0 | 16 |
| 17 | 0 | 17 | 0 | 17 | 0 | 17 | 0 | 17 |
| 18 | 1 | 19 | 1 | 19 | 1 | 19 | 0 | _18_ |
| 19 | 0 | 19 | 0 | 19 | 0 | 19 | 0 | 19 |

(* - Highest Address)

FIG. 5 illustrates a circuit board having the same wiring connection as the board illustrated in FIG. 4 except that wire 23 between circuit nodes 1, 7 and 13 is broken at point 66 between circuit nodes 7 and 13, thereby producing an inadvertent open circuit where there should be a continuous circuit. A scan of the addresses produces a new series of comparison signals $C_1$ which can now be compared with the comparison signals from the board of FIG. 4 which have been recorded as comparison signals $C_2$.

direct line between nodes 7 and 13, but at least the person inspecting the board for the open circuit can identify the two portions of the circuit that have been inadvertently disconnected. The time saving for troubleshooting is significant.

FIG. 6 illustrates a circuit board wired like that in FIG. 4 except that wires 27 and 28 are shorted together at point 67 where they cross. The above table sets forth the comparison signals for the circuit board of FIG. 6. It will be noted that these comparison signals are identical to those of the acceptable board of FIG. 4 with the sole exception of the signal for circuit node number 16 which is a logical 1 (true) for the board under test whereas it was logical 0 (false) for the acceptable board of FIG. 4. As pointed out above, this indicates that a short circuit exists between circuit node number 16 and a higher order circuit node.

When the highest order addresses found for the various input addresses of the board of FIG. 6 are compared with the highest order addresses for the board of FIG. 4, discrepancies are noted at circuit nodes 12 and 16, both of which are presently connected node 17. This information shows that the circuit including nodes 12 and 16 is inadvertently shorted to the circuit whose highest order address is 17. Again, the physical location of the short is not specifically identified but the two circuits that are shorted together are.

FIG. 7 illustrates another possible fault that may occur in a circuit board, particularly a wired board. In the board illustrated in FIG. 7, the connections of the wires 26 and 29 are interchanged so that wire 26 instead of being connected to circuit pin 14 is connected to pin 19 and wire 29 instead of interconnecting pins 18 and 19 interconnects pins 18 and 14. The above table sets forth the comparison signals for the circuit board of FIG. 7. These signals are the same as the corresponding comparison signals for the acceptable board of FIG. 4 except for circuit nodes 14 and 18. The logical 1 signal obtained at circuit node 14 as compared with the acceptable logical 0 indicates that this pin is shorted to a higher order node. Similarly, the logical 0 of thd comparison signal for circuit node 18 when a logical 1 should have been obtained indicates that an open circuit exists between circuit node 18 and a higher order node. The presence of such a double fault (one open and one short) on a board suggests the nature of the fault occurring as well as indicating its location.

When the highest order addresses for the board of FIG. 7 are compared with those for the acceptable board of FIG. 4, the location of the fault can be ascertained with a substantial degree of certainty. It is immediately noted that the desired connection between nodes 18 and 19 is missing. It is also found that circuit node 13 is improperly connected to circuit node 18. In addition, by noting the data for circuit node number 9, one also ascertains that the connection which should have been between this node and node 14 has actually been made to circuit node 19. With this much identification of the discrepancies on the board, they can be found and corrected readily. Generally speaking, to find the location of faults, one preferably seeks discrepancies from the highest order down.

One other significant advantage of the technique should also be noted that this ia an ability to trace a map of the eircuits on the board by means of a scan that applies a test signal only once to each circuit anode. This information is obtained by noting only the highest order addresses recorded for each input address and one simply ascertains and lists those lower order nodes which are connected to each node whose address appears in the highest order address data. The advantage of this is that only the input address and highest order address need be noted for each node and it is not necessary to scan all lower order nodes when a highest order node is identified. Although all nodes in a circuit have the test signal, the addresses of all but the highest are ignored.

As an example, it will be noted in the table that the highest order address for each of nodes 3, 4, 9 and 14 is each 14. No other node shows a highest order address of 14. From this, one deduces that circuit nodes 3, 4, 9 and 14 are electrically interconnected and no other node is electrically connected thereto. Such an analysis for each highest order node identified quickly maps the circuits in a network, if desired. It should be noted that this information is not needed for normal receiving inspection and troubleshooting of circuit networks, but is a collateral benefit of the technique provided herein for providing data for other purposes.

A previous technique for mapping circuits scanned the nodes with all lower (or higher) order nodes electrically shorted together. When an open between the anode with the test signal and all lower order nodes was detected, it was known that the lowest order in a circuit has been found. The scan was interrupted for another scan from the identified node through all higher order nodes. Each higher order node on which the test signal appeared was noted to provide a map of that circuit. The original scan with lower order nodes shorted together was then continued until interrupted when the next open circuit was noted. The time needed for this repetitive scanning can be significant. In the simple board of FIG. 4, a total of 148 measurements would be made to draw such a map. With the technique described herein, only 20 measurements need be made. When a more complex circuit network with hundreds of nodes is involved, the time for such prior scanning can be obtained but with the technique provided herein, the listing of nodes in each circuit can proceed at data processing rates rather than at the typical one kilohertz rate of scanning. In the illustrated arrangement, the addresses of the nodes to which the test signal is applied and the highest order addresses associated with each are simply recorded by the printer. Clearly, if desired, this information can be stored in a temporary memory and tabulated in wire lists or the like by automatic data processing before printing out the circuits in order.

The apparatus illustrated in FIG. 1 also includes a manual input arrangement for screening of boards for acceptability without loading any data into the random access memory. For this aspect of the apparatus, the comparison signal $C_1$ is applied to an adder 68, the output of which is applied to a 24 bit shift register 69. The final bit in the shift register is reapplied as an input to the adder 68. The comparison signals of the first 24 addresses are applied directly to the shift register through the adder 68. The twenty-fifth of the comparison signal and the first bit which has now cycled through the 24 bit shift register 69 are added together by the adder 68 and reapplied to the shift register. The process of adding continues as the addresses are scanned, so that no matter how many circuit nodes are in the network under test, only 24 bits of data are accumulated in the shift register. When the network under test has a very large number of circuit nodes, the resultant compaction or "folding over" of the data can be significant. Larger or smaller shift registers can also be used, if desired.

Eight manual thumb wheel switches 71 are provided on the panel of the test apparatus. Each of the eight thumb wheel switches is set according to an octal number so that 24 bits of binary information can be determined by the eight octal numerals. The use of octal switches is simply one of operator convenience since readily understood and it will be apparent that 24 binary switches may be used if desired. The binary output of the switches 71 is applied to a 24 bit comparator 72. The data in the shift register 69 is also applied to the 24 bit comparator to see whether the 24 individual bits of data in the shift register are identical to the corresponding 24 bits from the switches 71. Such test for equality is made at the end of the address scan when data from all of the circuit nodes from the board has been accumulated in the shift register. The "test for equal" signal is applied to the error detect loic to indicate whether a circuit network passes or is rejected. If all points in the 24 bit comparator are equal, the board is considered to be acceptable and, if a discrepancy is present, the board is considered faulty.

Since the train of comparison signals as the addresses are scanned for an acceptable board is always the same, the final "folded" data appearing in the shift register 69 at the end of the scan is always the same. Thus, for a particular type of circuit network under test, there is a unique octal number which corresponds to an acceptable board. If the train of comparison signals generates a number in the shift register different from the acceptable number, it invariably represents a fault. Any single fault in a circuit network will be detected in this manner. If double faults occur on a board at circuit addresses 24 bits apart, or multiples thereof, they may compensate and not be detected in the compacted data. Techniques for avoiding compensation for double faults and additional disclosure of such a data compaction technique are provided in the aforementioned copending U. S. patent application, Ser. No. 217,859. A typical way of programming the circuit testing apparatus involves, first, identification of an acceptable board and then storing of the comparison signals from the acceptable board in the random access memory 34. The storage technique has been described hereinabove. One way of identifying an acceptable board is to employ the data compaction portion of the apparatus. Typically, a substantial number of boards to be examined are available. Several such boards are tested in the apparatus and the octal number corresponding to the data in the shift register 69 is displayed on a shift register display panel 73. Preferably, the shift register display is simply a display of an octal number so that it correlates with the inputs on the switches 71.

A few of the boards to be inspected are placed in the circuit test jig one at a time and the comparison signals obtained for the circuit nodes in the network as hereinabove described. The octal number displayed for each of these boards is recorded and when three or four identical numbers have been noted, it can be safely assumed that these represent acceptable boards. The reason for this is that random faults that may occur on circuit boards have an extremely low probability of providing identical octal number outputs. One of these boards that is assumed to be acceptable is then used to provide the comparison signal for recording in the random access memory. The other boards can be compared with the one selected, without relying on the data folding to verify that they are identical.

It will be noted that a systematic error such as one where a wrong connection is made on all boards will not be detected in this manner. Some type of proof testing would ordinarily be provided if this is a suspected problem. It will also be noted that for a given model of circuit network which may be tested at various times, the octal number characteristic of acceptable boards of that model can be recorded and an acceptable board in a new batch immediately identified.

Many modifications and variations of the present invention will be apparent to one skilled in the art. Other arrangements may be used for applying a test signal to one node at a time such as, for example, step switches. Other means may be used for detecting the highest order node on which the test signal appears, such as, for example, flip-flops that are set by the test signal and reset if a higher order flip-flop is set. Many other modifications and variations will be apparent and it is therefore to be understood that within the scope of the appended claims, the invention may be practiced otherwise than as specifically described.

What is claimed is:

1. A method of testing a circuit network having a plurality of circuit nodes having an ordered array of addresses some of which circuit nodes may be electrically interconnected comprising the steps of:

applying a test signal to one circuit node having a selected address;

detecting the presence or absence of the test signal on all circuit nodes simultaneously; and determining the address of the highest order circuit node on which the test signal appears, thereby identifying the highest order circuit node to which said one circuit node is electrically connected.

2. A method of testing as defined in claim 1 further comprising the step of:

comparing the address of the highest order node on which the signal appears with a recorded highest order address for the respective one circuit node in a similar circuit network known to be acceptable.

3. A method of testing as defined in claim 1 further comprising the steps of:

comparing the address of the highest order node on which the signal appears with the address of the one circuit node to which the signal is applied for generating a first comparison signal; and comparing the first comparison signal with a recorded comparison signal for the respective one circuit node in a similar circuit network known to be acceptable.

4. A method of testing as defined in claim 3 further comprising the steps of:

generating a "rejection" signal if the determined highest order address is different from the recorded highest order address for at least one node in the circuit network; and generating a "pass" signal if the determined highest order addresses for each node are the same as the corresponding recorded highest order addresses for all nodes in the circuit network.

5. A method of testing as defined in claim 3 further comprising the steps of:

generating a "short" signal if the determined highest order address is higher than the corresponding recorded highest order address for at least one node in the circuit network; and generating an "open" signal if the determined highest order address is lower than the corresponding recorded highest order address for at least one node in the circuit network.

6. A method of testing a circuit network having a plurality of circuit nodes having an ordered array of addresses comprising the steps of:
   applying a test signal to one circuit node having a selected address;
   detecting the presence or absence of the test signal on all circuit nodes simultaneously; and
   distinguishing whether the highest order address on which the test signal appears is the same as or greater than the address of the node on which the test signal is applied.

7. A method as defined in claim 6 further comprising the step of:
   repeating the detecting, determining and distinguishing steps while repeating the applying step with respect to each circuit node in the array;
   comparing the results of the plurality of distinguishing steps with the results of similar steps on a like circuit network known to be acceptable.

8. A method of testing a network having a plurality of circuit nodes having an ordered array of addresses (A) comprising the steps of:
   a. applying a test signal to a circuit node having a selected address ($A_1$);
   b. detecting the highest order circuit node on which the test signal appears;
   c. comparing the address ($A_2$) of the highest order circuit node on which the signal is detected with the address $A_1$ of the circuit node to which the signal is applied;
   d. generating a first state of comparison signal $C_1$ if $A_2$ is greater than $A_1$ and a second state of comparison signal $C_1$ if $A_2$ is not greater than $A_1$;
   e. scanning the test signal over all of the circuit nodes in the network and repeating steps (a) through (d) for each; and
   f. comparing the comparison signals $C_1$ with respective comparison signals $C_2$ from a similar network known to be acceptable.

9. A method of testing as defined in claim 8 wherein the step of comparing comprises:
   reducing the sequence of comparison signals $C_1$ to a number having fewer bits than the number of circuit nodes in the network; and
   comparing the reduced number with a recorded number similarly reduced from a sequence of comparison signals from a similar network known to be acceptable.

10. A method of testing as defined in claim 8 wherein the step of comparing comprises:
    comparing each comparison signal $C_1$ from step (d) with a corresponding recorded comparison signal $C_2$ from a similar network known to be acceptable;
    generating a pass signal in response to equality of all corresponding comparison signals, respectively; and
    generating a rejection signal in response to any discrepancy between corresponding comparison signals.

11. A method of testing as defined in claim 10 wherein the step of generating a rejection signal comprises:
    generating a "short" signal in response to a present comparison signal $C_1$ indicating a higher order address $A_2$ than the corresponding recorded comparison signal $C_2$; and
    generating an "open" signal in response to a present comparison signal $C_1$ indicating a lower order address $A_2$ than the corresponding recorded comparison signal $C_2$.

12. A method of testing as defined in claim 11 further comprising the step of:
    stopping the scanning of the test signal when a rejection signal is sensed; and
    displaying or recording the address of the node to which the test signal is then applied and the highest order address on which the test signal then appears.

13. A method of testing as defined in claim 8 wherein the detecting step comprises:
    sensing the presence or absence of the test signal on all circuit nodes simultaneously; and
    inhibiting any lower order address signals with a signal generated in response to the test signal on the highest order address.

14. A method of mapping or listing circuits in a circuit network having a plurality of circuit nodes having an ordered array of addresses comprising the steps of:
    applying a test signal to a circuit node having a selected address;
    identifying the address of only the highest order circuit node on which the test signal appears;
    repeating the applying and identifying steps for each circuit node in the network for identifying the highest order address connected to each node, respectively; and
    listing all circuit nodes connected to each identified highest order node respectively.

15. A method of testing a circuit network comprising the steps defined in claim 14 and further comprising the step of:
    comparing the highest order addresses identified for each circuit node respectively with a corresponding, previously recorded, highest order address for a circuit network known to be acceptable, for detecting discrepancies therebetween.

16. Apparatus for testing a circuit network having a plurality of circuit nodes having an ordered array of addresses some of which circuit nodes may be electrically interconnected comprising:
    means for applying a test signal to one circuit node having a selected address;
    means for detecting the presence or absence of test signal on all circuit nodes simultaneously; and
    means for determining the address of the highest order circuit node on which the test signal appears which is the highest order circuit node electrically connected to the one circuit node.

17. Testing apparatus as defined in claim 16 further comprising:
    means for comparing the address of the highest order node on which the signal appears with a recorded highest order address for the respective one one circuit node in a similar circuit network known to be acceptable.

18. Testing apparatus as defined in claim 16 further comprising:
    means for comparing the address of the highest order node on which the signal appears with the address of the one circuit node to which the signal is applied for generating a first comparison signal; and means for comparing the first comparison signal with a recorded comparison signal for the respective one circuit node in a similar circuit network known to be acceptable.

19. Testing apparatus as defined in claim 18 further comprising:
means for generating a "short" signal if the determined highest order address is higher than the corresponding higher highest order address for at least one node in the circuit network; and
means for generating an "open" signal if the determined highest order address is lower than the corresponding recorded highest order address for at least one node in the circuit network.

20. Testing apparatus as defined in claim 18 further comprising:
means for generating a "rejection" signal if the determined highest order address is different from the recorded highest order address for at least one node in the circuit network; and
means for generating a "pass" signal if the determined highest order addresses for each node are the same as the corresponding recorded highest order addresses for all nodes in the circuit network.

21. Apparatus for testing a circuit network having a plurality of circuit nodes having an ordered array of addresses comprising:
means for applying a test signal to one circuit node having a selected address;
means for detecting the presence or absence of the test signal on all circuit nodes simultaneously; and
means for distinguishing whether the highest order address on which the test signal appears is the same as or greater than the address of the node on which the test signal is applied.

22. Testing apparatus as defined in claim 21 further comprising:
means for repeating the detecting, determining and distinguishing steps while repeating the applying step with respect to each circuit node in the array;
means for comapring the results of the plurality of distinguishing steps with the results of similar steps on a like circuit network known to be acceptable.

23. Apparatus for testing a network having a plurality of circuit nodes having an ordered array of addresses (A) comprising:
means for applying a test signal to a circuit node having a selected address ($A_1$);
means for detecting the highest order circuit node on which the test signal appears;
means for comparing the address ($A_2$) of the highest order circuit node on which the signal is detected with the address $A_1$ of the circuit node to which the signal is applied;
means for generating a first comparison signal if $A_2$ is greater than $A_1$ and a second comparison signal if $A_2$ is not greater than $A_1$;
means for repeatedly applying the test signal to each of the circuit nodes in the network and generating a series of comparison signals corresponding to each; and means for comparing the series of comparison signals with s second series of comparison signals from a similar network known to be acceptable.

24. Testing apparatus as defined in claim 23 wherein the means for comparing comprises:
means for reducing the sequence of comparison signals to a number having fewer bits than the number of circuit nodes in the network; and
means for comparing the reduced number with a recorded number similarly reduced from a sequence of comparison signals from a similar network known to be acceptable.

25. Testing apparatus as defined in claim 23 wherein the means for comparing comprises:
means for comparing each comparison signal in the first series with the corresponding recorded comparison signal in the second series;
means for generating a pass signal in response to equality of all corresponding comparison signals in the two series; and
generating a failure signal in response to any discrepancy between corresponding comparison signals in the two series.

26. Testing apparatus as defined in claim 25 wherein the means for generating a failure signal comprises:
means for generating a "short" signal in response to a present comparison signal indicating a higher order address $A_2$ than the corresponding recorded comparison signal; and
means for generating an "open" signal in response to a present comparison signal indicating a lower order address $A_2$ than the corresponding recorded comparison signal.

27. Testing apparatus as defined in claim 26 further comprising:
means for stopping the scanning of the test signal when a rejection signal is sensed; and
means for displaying or recording the address of the node to which the test signal is then applied and the highest order address on which the test signal then appears.

28. Testing apparatus as defined in claim 23 wherein the means for detecting comprises:
means for sensing the presence or absence of the test signal on all circuit nodes simultaneously; and
means for inhibiting any lower order address signals with a signal generated in response to the test signal on the highest order address.

29. Apparatus for listing circuits in a circuit network having a plurality of circuit nodes having an ordered array of addresses comprising:
means for applying a test signal to a circuit node having a selected address;
means for identifying the address of only the highest order circuit node on which the test signal appears;

means for repeating the applying and identifying steps for each circuit node in the network for identifying the highest order address connected to each node; and
means for listing all circuit nodes connected to each identified highest order node respectively.

30. Apparatus as defined in claim 29 further comprising:
means for comparing the highest order addresses identified for each circuit node respectively with a corresponding, previously recorded, highest order address for each circuit node respectively from a circuit network known to be acceptable, for detecting discrepancies therebetween.

31. Apparatus as defined in claim 29 further comprising:

means for comparing the address of the highest order circuit node on which the test signal appears with the address of the circuit node having the selected address for generating a first comparison signal; and means for comparing the first comparison signal with a recorded comparison signal for the respective circuit node having the selected address in a similar circuit network known to be acceptable for detecting discrepancies therebetween.

32. Apparatus for testing a circuit network having a plurality of circuit nodes having an ordered array of addresses A comprising:

means for applying a test signal to a circuit node having a selected address $A_1$;

means for simultaneously detecting the presence or absence of the test signal on all other nodes in the network;

means for distinguising the address $A_2$ of the highest order node on which the test signal is present;

means for generating a first comparison signal if $A_2$ is greater than $A_1$, and a second comparison signal if $A_2$ is not greater than $A_1$; and means for comparing the generated comparison signal with a recorded comparison signal.

33. Apparatus for testing a circuit network having a plurality of circuit nodes with an ordered array of addresses some of which circuit nodes may be electrically interconnected comprising:

means for applying a test signal to a circuit node having a selected address;

means for simultaneously detecting the presence or absence of the test signal on each circuit node in the array;

means for distinguishing the highest order node on which the test signal is present from all other circuit nodes; and means for comparing the address of the highest order node so distinguished with a desired highest order address for the node to which the signal is applied.

34. An apparatus for testing a circuit network having a plurality of circuit nodes having an ordered array of addresses some of which circuit nodes may be electrically interconnected comprising:

a decoder having a binary address signal input and an ordered plurality of outputs for applying a test signal to any one output corresponding to an address signal input;

a priority encoder network having a plurality of inputs each connected to an output of the decoder and a binary address signal output for generating a binary output address signal corresponding to the highest order input on which a test signal appears;

a circuit test jig having a plurality of contacts each connected to an output of the decoder and an input to the encoder for applying a test signal to any circuit node of an arbitrary circuit network inserted therein and for receiving a test signal from any circuit node of the network; receiving a test signal from any circuit node of the network; and an address comparator connected to the address signal input to the decoder and to the address signal output of the encoder and having a binary output line for generating a first comparison signal having a first binary output state if an address on the address signal output is greater than an address on the address signal input, and a second binary output state if an address on the address signal output is not greater than an address on the address signal input.

35. An apparatus as defined in claim 34 further comprising:

a memory for storing a plurality of second comparison signals in an ordered array corresponding to a series of binary addresses and reading one of said second comparison signals in response to a binary input address signal;

an address control connected to the decoder and to the memory for applying a binary input address signal to both;

means connected to the address comparator and the memory for comparing the first comparison signal corresponding to an input address with the second comparison signal corresponding to the same input address and generating an output signal if the comparison signals are not equal.

36. An apparatus as defined in claim 35 wherein the means for comparing comprises:

a comparator providing a first output signal if the binary state of the first comparison signal is greater than the binary state of the second comparison signal, and a second output signal if the binary state of the second comparison signal is greater than the binary state of the first comparison signal.

37. An apparatus as defined in claim 35 further comprising:

means for recording the input address and the output address for each input address for which the comparison signals are not equal.

38. Apparatus for testing a circuit network having a plurality of circuit nodes with an ordered array of addresses some of which circuit nodes may be electrically interconnected comprising:

means for applying a test signal to a circuit node having a selected address;

means for simultaneously detecting the presence or absence of the test signal on each circuit node in the array;

means for distinguishing the highest order node on which the test signal is present from all other circuit nodes;

means for comparing the address of the highest order circuit node on which the test signal is present with the address of the circuit node to which the signal is applied for generating a first comparison signal; and means for comparing the first comparison signal with a recorded comparison signal for the same circuit node respectively in a similar circuit network known to be acceptable.

39. A method of testing a circuit network having a plurality of circuit nodes having an ordered array of addresses comprising the steps of:

applying a test signal to one circuit node having a selected address;

detecting the presence or absence of the test signal on all circuit nodes simultaneously; and determining the presence or absence of a circuit node on which the test signal appears having a higher order address than the circuit node to which the test signal is applied.

40. Apparatus for testing a circuit network having a plurality of circuit nodes having an ordered array of addresses comprising:

means for applying a test signal to one circuit node having a selected address;

means for detecting the presence or absence of the test signal on all circuit nodes simultaneously; and means for determining the presence or absence of a circuit node on which the test signal appears having a higher order address than the circuit node to which the test signal is applied.

* * * * *

PO-1050
(5/69)

UNITED STATES PATENT OFFICE
CERTIFICATE OF CORRECTION

Patent No. __3,851,161__      Dated __November 26, 1974__

Inventor(s) __Andrew P. Sloop__

It is certified that error appears in the above-identified patent and that said Letters Patent are hereby corrected as shown below:

| Location in Patent | Location in Application | Error |
|---|---|---|
| Abstract, lines 11 and 13 | Page 1, lines 13 and 15 | "addresss" should be --address--. |
| Column 1, line 8 | Page 2, line 4 | "tin" should be --in--. |
| Column 1, line 43 | Page 3, line 8 | "borken" should be --broken--. |
| Column 5, line 60 | Page 12, line 4 | "1 to 8" should be --1 of 8--. |
| Column 6, line 30 (truth table) | Page 13, line 11 | the ninth line of the table should be inserted as follows reading across:<br><br>0 X X X    0 0 0 0 0 0 0 0 |
| Column 6, line 59 | Page 14, line 5 | "1 to 8" should be --1 of 8--. |
| Column 7, line 30 | Page 15, line 16 | "Al" should be --AI--. |
| Column 7, line 50 | Page 16, line 14 | "Al" should be --AI--. |
| Column 10, line 49 | Page 22, line 18 | "signal" should be --signals--. |
| Column 11, line 40 | Page 24, line 20 | there should be a period after "present". |

PO-1050 (5/69)

UNITED STATES PATENT OFFICE
CERTIFICATE OF CORRECTION

Patent No. __3,851,161__  Dated __November 26, 1974__

Inventor(s) __Andrew P. Sloop__

It is certified that error appears in the above-identified patent and that said Letters Patent are hereby corrected as shown below:

| Location in Patent | Location in Application | Error |
|---|---|---|
| Column 11, line 51 | Page 25, line 2 | "he" should be --the--. |
| Column 12, line 45 | Page 27, line 9 | "descrepancy" should be --discrepancy--. |
| Column 13, line 29 | Page 29, line 6 | "in" should be --the--. |
| Column 13, line 52 | Page 30, line 15 | the table should read as follows: |

| INPUT ADDRESS | FIG. 4 | | FIG. 5 | | FIG. 6 | | FIG. 7 | |
|---|---|---|---|---|---|---|---|---|
| | $C_1$ | Add.* | $C_1$ | Add.* | $C_1$ | Add.* | $C_1$ | Add.* |
| 0  | 1 | 10 | 1 | 10 | 1 | 10 | 1 | 10 |
| 1  | 1 | 13 | 1 | _7_ | 1 | 13 | 1 | 13 |
| 2  | 1 | 6  | 1 | 6  | 1 | 6  | 1 | 6  |
| 3  | 1 | 14 | 1 | 14 | 1 | 14 | 1 | _19_ |
| 4  | 1 | 14 | 1 | 14 | 1 | 14 | 1 | _19_ |
| 5  | 1 | 17 | 1 | 17 | 1 | 17 | 1 | 17 |
| 6  | 0 | 6  | 0 | 6  | 0 | 6  | 0 | 6  |
| 7  | 1 | 13 | _0_ | _7_ | 1 | 13 | 1 | 13 |
| 8  | 0 | 8  | 0 | 8  | 0 | 8  | 0 | 8  |
| 9  | 1 | 14 | 1 | 14 | 1 | 14 | 1 | _19_ |
| 10 | 0 | 10 | 0 | 10 | 0 | 10 | 0 | 10 |
| 11 | 0 | 11 | 0 | 11 | 0 | 11 | 0 | 11 |
| 12 | 1 | 16 | 1 | 16 | 1 | _17_ | 1 | 16 |
| 13 | 0 | 13 | 0 | 13 | 0 | 13 | 0 | 13 |
| 14 | 0 | 14 | 0 | 14 | 0 | 14 | _1_ | _18_ |
| 15 | 0 | 15 | 0 | 15 | 0 | 15 | 0 | 15 |
| 16 | 0 | 16 | 0 | 16 | _1_ | _17_ | 0 | 16 |
| 17 | 0 | 17 | 0 | 17 | 0 | 17 | 0 | 17 |
| 18 | 1 | 19 | 1 | 19 | 1 | 19 | _0_ | _18_ |
| 19 | 0 | 19 | 0 | 19 | 0 | 19 | 0 | 19 |

(* - Highest Address)

PO-1050
(5/69)

UNITED STATES PATENT OFFICE
CERTIFICATE OF CORRECTION

Patent No. __3,851,161__ Dated __November 26, 1974__

Inventor(s) __Andrew P. Sloop__

It is certified that error appears in the above-identified patent and that said Letters Patent are hereby corrected as shown below:

| Location in Patent | Location in Application | Error |
|---|---|---|
| Column 14, line 18 | Page 31, line 26 | after "signal" and before "appears" delete "highest order address on which the test signal". |
| Column 15, line 12 | Page 33, line 9 | --to-- should be inserted after "connected" and before "node". |
| Column 15, line 33 | Page 34, line 1 | "thd" should be --the--. |
| Column 15, line 46 | Page 34, line 18 | "13" should be --14--. |
| Column 15, line 56 | Page 34, line 25 | "ia" should be --is--. |
| Column 15, line 57 | Page 34, line 26 | "eircuits" should be --circuits--. |
| Column 15, line 58 | Page 34, line 28 | "anode" should be --node-- |
| Column 16, line 33 | Page 36, line 13 | after "can be" insert --relatively long. The same total quantity of data is--. |
| Column 17, line 14 | Page 38, line 5 | "loic" should be --logic-- |
| Column 20, line 39 Claim 15 | Page 3, Amendment April 9, 1974, Claim 14, line 6 | "for" should be --from--. |

PO-1050
(5/69)

UNITED STATES PATENT OFFICE
CERTIFICATE OF CORRECTION

Patent No. 3,851,161     Dated November 26, 1974

Inventor(s) Andrew P. Sloop

It is certified that error appears in the above-identified patent and that said Letters Patent are hereby corrected as shown below:

| Location in Patent | Location in Application | Error |
|---|---|---|
| Column 20, line 59 Claim 17 | Page 47, line 5 Claim 16 | delete "one" (second occurrence). |
| Column 21, line 9 Claim 19 | Page 47, line 5 Claim 17 | delete "higher" after "responding" and before "highest". |
| Column 21, line 45 Claim 22 | Page 48, line 7 Claim 20 | "comapring" should be --comparing--. |
| Column 23, lines 66 and 67 Claim 34 | Page 6, Amendment April 9, 1974, line 18 Claim 31 | "receiving a test signal from any circuit node of the network" (second occurrence) should be deleted. |

Signed and sealed this 11th day of February 1975.

(SEAL)
Attest:

RUTH C. MASON
Attesting Officer

C. MARSHALL DANN
Commissioner of Patents
and Trademarks